S. W. RUGGLES.
STUMP EXTRACTOR.
No. 14,830.                     Patented May 6, 1856.
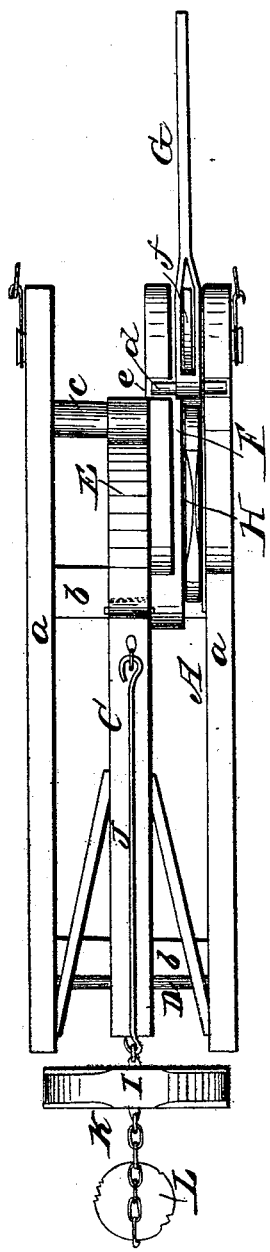
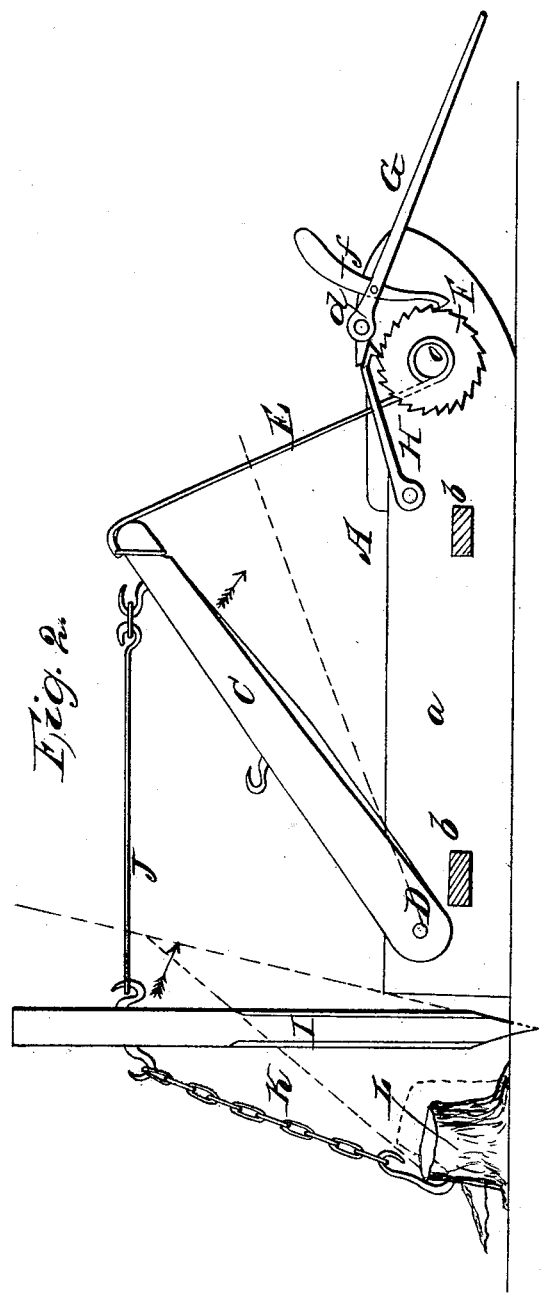

UNITED STATES PATENT OFFICE.

SOLOMON W. RUGGLES, OF FITCHBURG, MASSACHUSETTS.

MACHINE FOR EXTRACTING STUMPS.

Specification of Letters Patent No. 14,830, dated May 6, 1856.

*To all whom it may concern:*

Be it known that I, SOLOMON W. RUGGLES, of Fitchburg, in the county of Worcester and State of Massachusetts, have invented a new and Improved Machine for Extracting Stumps of Trees from the Earth; and I do hereby declare that the following is a full, clear, and exact description of the same, reference being had to the annexed drawings, making a part of this specification, in which—

Figure 1, is a plan or top view of my improvement. Fig. 2, is a side view of the same, the side or runner of the sled nearer the eye being removed.

Similar letters of reference indicate corresponding parts in both figures.

My invention consists in the employment or use of a lever frame operated by a pawl, ratchet and strap, and using in connection therewith, a frame or strut which is connected by a chain to the stump to be extracted, the frame or strut being connected to the lever frame by a rod. The lever frame pawl, ratchet and strap, are attached permanently to a sled by which the implement is readily moved from place to place and applied and operated with the greatest facility.

To enable those skilled in the art to make and use my invention I will proceed to describe its operation and construction.

A, represents a sled which may be of usual construction formed merely of two runners (*a*,) (*a*), connected by cross ties (*b*).

C, represents a lever frame the lower end of which is fitted or works on a rod D, which passes transversely through the back part of the sled A. This lever frame has a strap E attached to its outer end which strap passes around a shaft (*c*) at the front part of the sled. On the shaft (*c*) near one end, there is attached a ratchet F, and G is a lever, the inner end of which has a shaft (*d*) passing through it said shaft being fitted in bearings (*e*) on the sled. The lever G has a pawl (*f*) pivoted to it, which pawl catches into the ratchet F,—H, is a retaining pawl attached to the sled, said pawl also catching into the ratchet F.

I, is a frame or strut which is detached from the sled A. This frame or strut is connected to the lever frame C, by a rod J, and K is a chain attached to the frame or strut as shown clearly in Fig. 2.

The implement is used as follows: The sled with the several parts attached to it, as described, is drawn by a team to the place where it is to be used, and the back part of the sled is placed near the stump L, to be extracted. The frame or strut I, is then placed in an upright position between the sled and stump, the lower end of the frame or strut resting upon the ground or penetrating it a short distance. The chain K is then attached to the stump and the frame or strut connected to the lever frame C, by the rod J. The lever G, at the front part of the sled is then worked up and down by hand the pawl (*f*) turning the ratchet F, and shaft (*c*) as the lever is moved upward and the pawl H, retaining the ratchet during the descent of the lever. The strap E, is wound around the shaft (*c*) as it rotates and the lever frame C, is drawn downward and also the frame or strut I, in the direction indicated by the arrows, see Fig. 2, and the stump L, is drawn out of the ground. The power of the implement may be increased or diminished by varying the length of the lever G, the size of the ratchet F and the point of attachment of the rod J, to the lever frame C.

The above implement may be cheaply constructed, may be readily conveyed from place to place, and will be a valuable acquisition to every farmer.

Having thus described my invention, what I claim as new and desire to secure by Letters Patent, is—

The lever frame C, operated by the lever G, pawl (*f*), H, ratchet F, and strap E, when the above parts are attached to the sled A and arranged as shown and used in connection with the frame or strut I, for the purpose specified.

SOLOMON W. RUGGLES.

Witnesses:
W. J. MERRIAM,
GEORGE H. SHERWIN.